March 11, 1969   R. R. BALAGUER   3,432,364
WARMING DEVICE
Filed May 18, 1965

United States Patent Office 3,432,364
Patented Mar. 11, 1969

3,432,364
WARMING DEVICE
Rodolfo Rodriguez Balaguer, Fort Lauderdale, Fla., assignor, by mesne assignments, to Patent Holding Corporation, Fort Lauderdale, Fla., a corporation of Florida
Filed May 18, 1965, Ser. No. 456,619
U.S. Cl. 136—181                                    2 Claims
Int. Cl. A61f 7/06; H05b 3/10; H01m 21/06

ABSTRACT OF THE DISCLOSURE

A hand holdable warming apparatus, comprising an inside-out magnesium anode dry cell battery having a dual cathode element formed by a green carbon cup and a central carbon rod, a coil of copper wire wound about the exterior of the cup throughout substantially its length, and means for connecting opposite ends of the wire to the battery anode and cathode.

---

The present invention relates to warming devices, and more particularly to an improved warming device of simple construction for raising the temperature of a surrounding medium above ambient. It has particular use as a hand warmer or a warming unit for other purposes such as for warming sealed battery power packs for use at low temperatures where efficiency would be increased by maintaining a temperature higher than ambient.

The principal object of the present invention is to provide a warming device of simple and inexpensive construction.

Another object of the invention is to provide such a warmer that will be of small size capable of being used as a hand warmer.

Still another object of the invention is to provide such a warmer that will have a continuous heating life commensurate with its cost.

A further object of the invention is to provide such a warmer that is electrically operated.

Ordinary zinc dry cell batteries have a relatively low watt-hour capacity. On the other hand, a magnesium dry cell battery has a relatively high watt-hour capacity.

It has been found that by winding a copper wire about the outside of a D-size magnesium dry cell battery and connecting opposite ends of the wire to the anode and cathode, a temperature can be reached, at the surface of the wound coil, of approximately 100° F. with an ambient temperature of 70° F.

In one aspect of the invention, a so-called "inside-out" type of dry cell may comprise a carbon cup that is open at one end and closed by an integral carbon cap at the other end, from which cap a longitudinally extending centrally disposed rod may extend, forming an annular space between the inside of the cup and the central rod.

In another aspect of the invention, the annular space between the cup wall and rod may be filled with a battery mix. A small space above the free end of the central rod may be reserved as an air space for collecting fluid exuded upon discharge of the cell.

In still another aspect of the invention, a magnesium anode of tubular form may be provided which is of a diameter so that it can be located between the rod and cup wall and concentric therewith. The anode is spaced from the cathode cap and may be provided with a bibulous coating to prevent direct contact between the anode and the battery mix. An end cap may be soldered to the outer end of the anode forming the closure of the open end of the cup. The dry cell may be made in accordance with the principles of the invention shown, described and claimed in United States patent applications Ser. Nos. 260,270, now Patent No. 3,272,655, and 312,049, now Patent No. 3,214,299, filed on Feb. 21, 1963, and Sept. 27, 1963, respectively, in the name of Rodolfo Rodriquez Balaguer to which applications reference is directed for specific details of the dry cell not specifically described herein.

In a further aspect of the invention, the outer surface of the carbon cup may be covered with an insulating jacket such as a plastic cover.

In a still further aspect of the invention, a copper wire may be wound about the outer surface of the insulating jacket such that its diameter and number of turns provide a desired temperature at the exterior of the copper coil commensurate with a desired continuous life of the dry cells when the opposite ends of the coiled copper wire are connected, respectively, to the anode and cathode.

In a further aspect of the invention, a switch may be fixed to the cell and connected into the coiled copper wire so as to make and break a circuit through the coil.

Other and further objects, features and advantages of the invention will appear more fully from the following description of the invention taken in connection with the appended drawing, in which.

Figure 2:
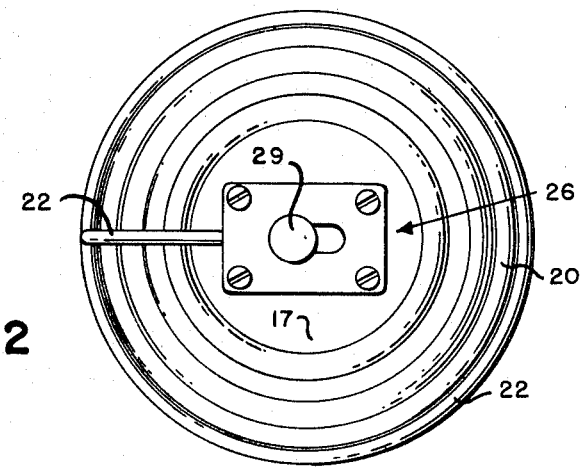
FIG. 2 is a top plan view of the warmer of FIG. 1.

Referring to the drawing, the principles of the invention are shown as applied to a warmer comprising a so-called "inside-out" type of dry cell that may be made in accordance with the invention shown, described and claimed in the aforementioned patent applications.

The dry cell may include a cup 10, base 11 and rod 12 formed of a molded green carbon, as described in U.S. Patent 2,903,499. Preferably the molding composition will be formed in accordance with the teachings of Rodolfo Rodriguez Balaguer United States patent application Ser. No. 208,096, now Patent No. 3,196,025, filed July 6, 1962.

The annular space between the cup 10 and the central rod 12 is filled with battery mix 15. The space within cup 10 and above the free end of rod 12 may be reserved as an air space into which may flow liquid exuded upon discharge of the cell. In some cells, particularly magnesium cells, this air space may be quite small or may be omitted.

A hollow cylindrical anode 16 is inserted into the battery mix with one end being adjacent but spaced from base 11 and the other end projecting beyond the free end of cup 10. A suitable bibulous coating may be provided on anode 16 to prevent direct contact between the anode and the battery mix.

An end cap 17 is soldered to the outer end of anode 16 and forms a part of the cell closure and also one of th battery terminals. The inner surface of end cap 17 is preferably covered with an asphalt or similar protective coating 18. The soldering of the anode 16 to end cap 17 and the formation of protective layer 18 are preferably effected in accordance with the teachings of Rodolfo Rodrigues Balaguer United States patent application Ser. No. 146,505, now Patent No. 3,189,487, filed Oct. 20, 1961.

A cardboard or similar washer 19 having a flange 19′ lies on the free end of cup 10 and separates the cup 10 physically and electrically from cap 17. A flat shoulder 20 of cap 17 lies against the opposite surface of washer 19. The outer edge of cap 17 is curved inwardly, as shown at 21, and extends along flange 19′. The edge 21 is crimped to the flange 19′ which is backed up by cup 10.

The anode 16 may be formed from magnesium or a magnesium alloy and typically might be 0.050″ to 0.065″ thick and be rolled into a cylinder having a ⅞″ outside diameter. The foregoing and other dimensions set forth herein are given only by way of illustration and refer to a normal size D cell.

The battery mix 15 may be of any type suited to the anode metal selected. A typical battery mix composition for use with a magnesium anode is the following, percentages being by weight:

| | |
|---|---|
| Type M manganese dioxide (synthetic) chemical ore _____percent__ | 88 |
| Mg (OH)$_2$ _____do____ | 1 |
| Ba Cr O$_4$ _____do____ | 3 |
| Acetylene black wet 550 ml./1000 g. with 250 g./l. Mg Br$_2$+ _____do____ | 8 |
| Na$_2$ Cr O$_4$ _____g./l__ | 0.25 |

Figure 1:
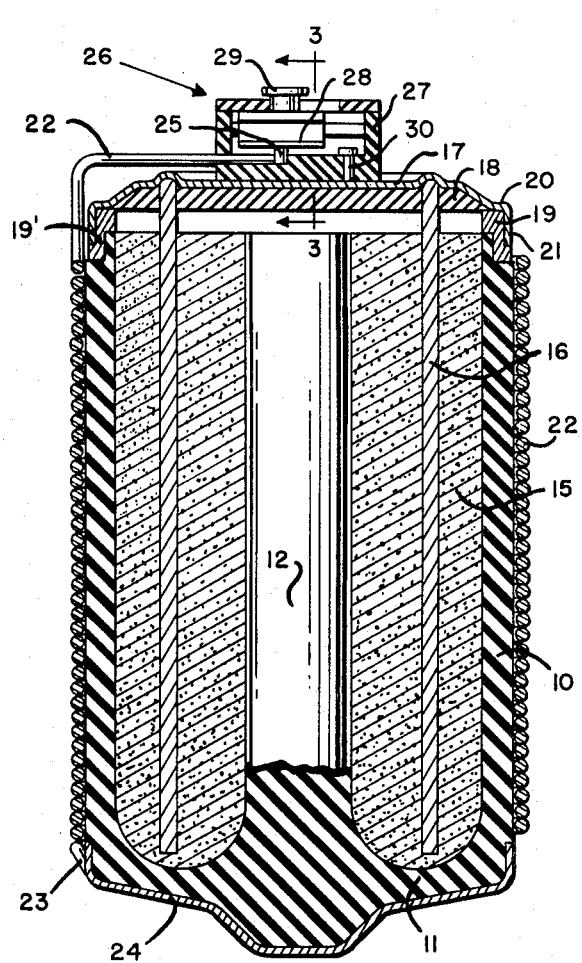
FIG. 1 is a sectional elevational view of a warmer to which the principles of the invention have been applied.
Figure 3:
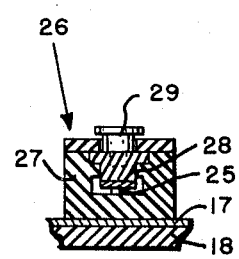
FIG. 3 is a sectional view taken substantially along line 3—3 of FIG. 1.

The dry cell battery shown in FIG. 1 may typically correspond substantially to the standard D size, and have an outside diameter of about 1.356″. The diameter of rod 12 might be 5/16″ while the thickness of the walls of cup 10 might be 1/16″. The outside diameter of cup 10 might be 1.290″.

Although the warmer may have an insulating coating about the cup 10, preferably a copper wire 22 is coiled about the cup between its ends. The wire may be a No. 26 enamel-coated wire, a cloth-coated wire, or any insulated wire. Inasmuch as the temperature involved is relatively low and is radiated as well as conducted from the inside of the cell to the outside, the type of insulation on the copper wire 22 is not critical. It is important to bear in mind that the heat generated within the cell is desirably moved as rapidly as possible from the inside of the cell to the outside surface. A too heavy insulation on the copper wire 22 would impede the flow of this heat and detract from the efficacy of the device.

A heavier wire than No. 26 will develop more temperature with fewer hours of usefulness, while a thinner gauge wire will develop less temperature with more hours of usefulness.

In the embodiment disclosed, one hundred turns of enamel-coated No. 26 gauge copper wire was wound about a magnesium cell of the above described type and size. One end 23 of the wire 22 is soldered to, or otherwise electrically connected to, a metal base cap 24 that is in electrical contact with base 11 of the carbon cup 10 and which cap 24 is the battery cathode terminal.

The opposite end of wire 22 is connected to a terminal 25 of a switch 26. The switch may be fixed to the cell at any location and is shown as being mounted on the cap 17 forming the anode of the cell. The housing 27 of switch 26 is of insulating material and includes a slide contact 28 having an insulating button 29 extending therefrom. A terminal 30 within switch 26 is connected to the anode cap 17. Accordingly, the sliding of button 29 to the right connects the ends of coil 22 to the anode and cathode of the cell, generating heat due to the resistance of the wire coil 22 as well as the internal resistance of the cell.

One hundred turns of the No. 26 gauge copper wire has an approximately resistance of 1¾ ohms and will draw from the battery approximately 1 ampere when switch 26 is closed.

Under test conditions, with an ambient temperature of 70° F. and with switch 26 closed, a temperature at the outside of coil 22 of approximately 100° F. was continuously produced for about ten hours. This surprising amount of heat is probably due to the fact that the potential of the magnesium anode is about 2.7 volts but the true potential of the battery is only 1.9 volts. This means that a great deal of power is dissipated inside the battery which generates heat when switch 26 is closed. The internal resistance of the cell will also generate heat. All of this heat is added to that produced by the coil 22 to give the resultant temperature at the exterior of coil 22.

The diameter of the wire or coil 22 may be adjusted, as previously explained, so as to produce more or less temperature with correspondingly decreased or increased hours o fbattery performance.

Tests for the warming device were made, taking three jars containing 80 cc. of water at room temperature.

In jar No. 1 was placed a magnesium cell constructed as shown in the drawing with the copper wire wound around it. The cell and coil were covered by the water.

In jar No. 2 an identical cell was immersed in the water while the copper coil was held outside.

In jar No. 3 the copper coil was immersed in the water while the cell was held outside, the cell being identical to that of jars No. 1 and No. 2.

In each case the water temperature was measured and recorded at intervals of time during the discharge. The results were as follows:

USING ENAMEL COPPER WIRE NO. 26

| Magnesium cell (hours) | Temperature of (° F.)— | | |
|---|---|---|---|
| | Jar No. 1 | Jar No. 2 | Jar No. 3 |
| 0 | 69.0 | 69.0 | 69.0 |
| ½ | 85.5 | 79.5 | 77.0 |
| 1 | 88.5 | 81.5 | 79.0 |
| 2 | 89.0 | 82.0 | 79.0 |
| 3 | 89.0 | 82.0 | 79.0 |
| 5 | 85.0 | 81.0 | 76.0 |
| 6 | 80.0 | 78.0 | 72.0 |
| 7 | 78.0 | 76.0 | 71.0 |
| 8 | 75.0 | 74.0 | 70.0 |
| 9 | 74.0 | 73.5 | 69.0 |
| 12 | 71.0 | 70.0 | 69.0 |

Placing a commercial industrial zinc cell size D under exactly the same conditions as the magnesium gave the following results:

| Hours | Temperature of (° F.)— | | |
|---|---|---|---|
| | Jar No. 1 | Jar No. 2 | Jar No. 3 |
| 0 | 69.0 | 69.0 | 69.0 |
| ½ | 71.0 | 70.5 | 70.8 |
| 1 | 71.8 | 70.8 | 71.2 |
| 2 | 71.2 | 70.5 | 71.0 |
| 3 | 70.0 | 69.8 | 70.0 |
| 4 | 69.0 | 69.0 | 69.0 |

It can be seen that in jar No. 2 where the cell alone is inside the water, there was substantially no rise in temperature. In jar No. 1 where the cell with the wire wrapped around it was immersed in the water, the rise of temperature produced was very poor and the cell lasted only about four hours.

Comparing the device of this invention using a magnesium cell of the type described with one using an industrial type zinc cell, there is a tremendous difference.

While the invention has been described in connection with a specific embodiment thereof and in a specific use, various modifications thereof will occur to those skilled in the art without departing from the spirit and scope of the invention as set forth in the appended claims.

What is claimed is:

1. A hand holdable warming apparatus comprising in combination, a D-size magnesium dry cell battery including a molded green carbon cup having a closed end and an open end; a carbon rod projecting from said closed end and extending generally along the longitudinal axis of said cup and being electrically connected thereto, said cup and rod forming a cathode structure; a tubular magnesium anode disposed concentrically between said rod and cup; electrically conductive closure means for the open end of said cup connected to said anode; battery mix contained in and substantially filling the annular spaces between said anode and said cup and rod; a coil of copper wire wound about the exterior of said cup throughout substantially its length; and means for connecting opposite ends of said coiled wire to said anode and said cathode.

2. A hand holdable warming apparatus comprising in combination, a D-size magnesium dry cell battery including a molded green carbon cup having a closed end and an open end; a carbon rod projecting from said closed end and extending generally along the longitudinal axis of said cup and being electrically connected thereto, said cup and rod forming a cathode structure; a tubular magnesium anode disposed concentrically between said rod and cup; electrically conductive closure means for the open end of said cup connected to said anode; battery mix contained in and substantially filling the annular spaces between said anode and said cup and rod; a coil of No. 26 enameled copper wire wound about the exterior of said cup throughout substantially its length; and means for connecting opposite ends of said coiled wire to said anode and said cathode.

References Cited

UNITED STATES PATENTS

| | | | |
|---|---|---|---|
| 499,848 | 6/1893 | Norton | 136—181.11 |
| 2,903,499 | 9/1959 | Balaguer | 136—107 |

WINSTON A. DOUGLAS, *Primary Examiner.*

DONALD L. WALTON, *Assistant Examiner.*

U.S. Cl. X.R.

126—204; 219—538